Patented Sept. 9, 1952

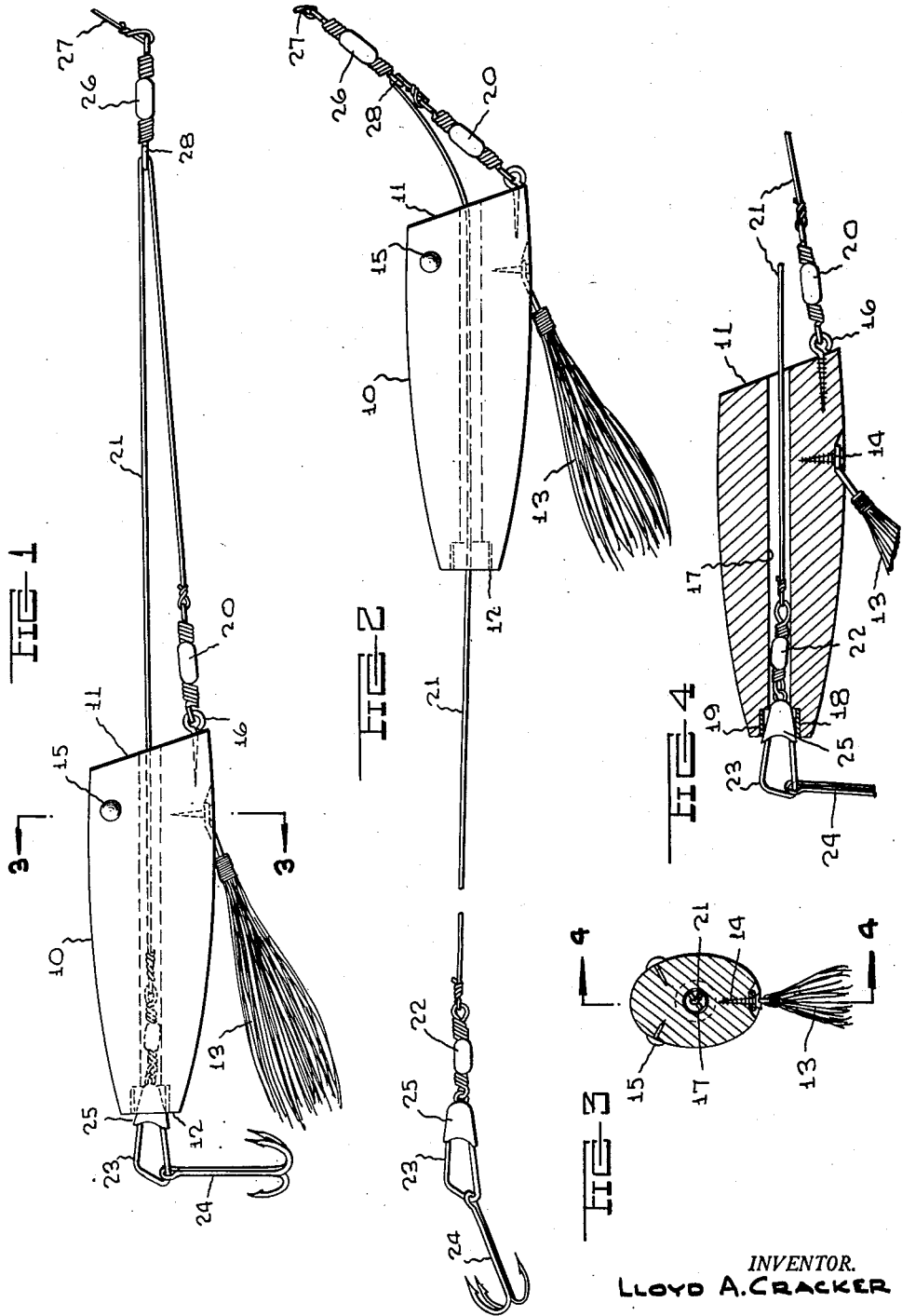

2,609,633

UNITED STATES PATENT OFFICE 2,609,633

PLUG-TYPE FISH LURE

Lloyd A. Cracker, Muscatine, Iowa

Application March 20, 1951, Serial No. 216,591

3 Claims. (Cl. 43—42.05)

This invention relates to plug-type fish lures, and more particularly to a plug-type lure assembly including means for moving the plug away from the hook when the hook has been struck by a fish.

It is among the objects of the invention to provide an improved fish lure assembly including a lure plug and a hook both connected by a leader to a fishing line in a manner such that the plug will move away from the hook when the hook is struck by a fish or caught on a submerged object, so that a fish cannot use the weight of the plug to shake the hook loose, and so that the plug will not interfere with efforts to dislodge the hook from a submerged object and will not be lost if the hook is pulled off; which maintains the hook and plug in contiguous relationship for casting, and which is simple and durable in construction and economical to manufacture, effective in use, and neat and attractive in appearance.

Other objects and advantages will become apparent from a consideration of the following description and the appended claims in conjunction with the accompanying drawing, wherein:

Figure 1 is a side elevational view of the lure of the invention showing the parts in position for casting with the hook contiguous to the rear end of the lure plug;

Figure 2 is a side elevational view similar to Figure 1, but showing the hook separated from the rear end of the lure plug;

Figure 3 is a transverse cross-sectional view on the line 3—3 of Figure 1; and

Figure 4 is a longitudinal cross-sectional view on the line 4—4 of Figure 3.

With continued reference to the drawing, the lure plug 10 is an elongated body of buoyant material, such as wood, or of buoyant construction, of rounded or substantially elliptical cross-sectional shape, as particularly illustrated in Figure 4, and tapered from its larger front end 11 to its smaller rear end 12. The rear end is in a plane substantially perpendicular to the longitudinal center line of the body, and the front end is in a plane inclined to the longitudinal center line of the body to control the diving operation of the lure plug. The inclination of the front end is such that the top side of the lure is somewhat shorter than the bottom side, and a tassel 13, formed of hair, is secured at one end to the lure plug at the bottom side and near the front end of the plug by suitable means, such as the wood screw 14. Tacks 15 are driven into the upper portion of the lure plug near the front end thereof to simulate eyes, and a screw eye 16 is threaded into the front end of the plug at the lower side thereof. A bore 17 extends longitudinally through the plug from the front end to the rear end thereof substantially along the longitudinal center line of the plug and is provided at the rear end of the plug with a counterbore 18 of somewhat larger diameter than the diameter of the bore. A thin-walled metal ferrule 19 of cylindrical shape is secured in the counterbore 18 for a purpose to be presently described.

A swivel joint 20 of well known construction is connected at one end to the screw eye 16 in the front end of the plug and a leader 21, preferably formed of wire, is connected at one end to the other end of the swivel connector 20. This leader extends through the bore 17 of the plug, and a second swivel connector 22, also of well known construction, is connected at one end to the end of the leader 21 remote from the swivel connector 20.

A safety catch 23, substantially in the form of a conventional safety pin is secured at one end to the end of the swivel connector 22 remote from the leader 21, and a triple hook or gang hook 24 is connected to the swivel connector 22 by the safety catch 23. The internal diameter of the ferrule 19 is such that this ferrule closely receives the head 25 of the safety catch and retains the safety catch head therein until a sufficient force is exerted on the hook 24 to pull the head of the safety catch out of the ferrule.

A third swivel connector 26, also of well known construction, is adapted to be connected at one end to the fishing line 27, and has at its other end an eye 28 which slidably receives the leader 21 between the swivel connector 20 and the end of the bore 17 at the front end of the lure plug.

With this arrangement, the head 25 of the safety catch may be inserted in the ferrule 19 and the eye 28 drawn along the leader 21 until both sides of the leader extending from the eye 28 are substantially straight, as illustrated in Figure 1. The lure assembly is then in condition for casting. After the lure has been cast and when the hook 24 is struck by a fish, the pull of the fish on the hook will pull the head 25 of the safety catch out of the ferrule 19 and will pull the leader 21 rearwardly through the bore of the plug, the leader sliding through the eye 28 until the front end of the swivel connector 20 is adjacent the eye 28 and the hook 24 is spaced rearwardly from the plug 10 a distance depending on the length of the leader 21. The length of this leader can be adjusted to suit the judgment of the fisherman and for particular fishing conditions.

If the hook should become engaged in a submerged object, a pull on the line 27 will move the plug away from the hook so that the leader can be worked to free the hook, or, if sufficient pull is placed on the hook to release the safety catch 23, causing loss of the hook, the plug will not be lost, since the stiffness of the leader 21 will maintain it on the leader while it is being reeled in.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fish lure assembly comprising an elongated plug of rounded cross-sectional shape having a front end and a rear end and a bore extending longitudinally therethrough from one end to the other, a first swivel connector connected at one end to said plug at the front end of the latter, a leader connected at one end to the other end of said first swivel connector and extending through the bore of said plug, a second swivel connector connected at one end to the other end of said leader, a safety catch connected to the other end of said second swivel connector, a hook connected to said second swivel connector by said safety catch, and a third swivel connector adapted to be connected at one end to a fishing line and having its other end an eye slidably receiving said leader between said first swivel connector and the end of said bore at said front end of the plug.

2. A fish lure assembly comprising an elongated plug of rounded cross-sectional shape having a front end and a rear end and a bore extending longitudinally therethrough from one end to the other, a first swivel connector connected at one end to said plug at the front end of the latter, a leader connected at one end to the other end of said first swivel connector and extending through the bore of said plug, a second swivel connector connected at one end to the other end of said second swivel connector, a safety catch connected to the other end of said second swivel connector, a hook connected to said leader by said safety catch, a third swivel connector adapted to be connected at one end to a fishing line and having at its other end an eye slidably receiving said leader between said first swivel connector and the end of said bore at said front end of the plug, said plug having a counterbore at the rear end of said bore, and a cylindrical ferrule secured in said counterbore, said safety catch having a head frictionally engageable in said ferrule to releasably maintain said hook contiguous to the rear end of said plug.

3. A fish lure assembly comprising an elongated plug of rounded cross-sectional shape having a front end and a rear end and a bore extending longitudinally therethrough from one end to the other with a counterbore at the end of said bore at the rear end of said plug, a metallic ferrule secured in said counterbore, a leader pivotally connected at one end to said plug at the front end of the latter, extending forwardly therefrom, and then extending back through said bore, a safety catch pivotally connected to the other end of said leader and having a head frictionally engageable in said ferrule, a hook secured to said leader by said safety catch, and an eye slidably receiving said leader between said one end thereof and the end of said bore at the front end of said plug and adapted to be connected to one end of a fishing line.

LLOYD A. CRACKER.

REFERENCES CITED

The following references are of record in the file of this patent:

UNITED STATES PATENTS

| Number | Name | Date |
| --- | --- | --- |
| 1,177,281 | Schweickert | Mar. 28, 1916 |
| 1,390,458 | Moree | Sept. 13, 1921 |
| 1,863,125 | Powell | June 14, 1932 |
| 2,236,353 | Minser | Mar. 25, 1941 |